United States Patent
Alaerts et al.

[11] Patent Number: 5,922,990
[45] Date of Patent: Jul. 13, 1999

[54] ENVIRONMENTAL PROTECTION

[75] Inventors: Roger Alaerts, Aarschot; Valere Buekers, Zelem-Halen; Roger Delvaux, Kessel-Lo; Marc Vanonckelen, Halen, all of Belgium

[73] Assignee: N.V. Raychem S.A., Kessel-Lo, Belgium

[21] Appl. No.: 08/817,684

[22] PCT Filed: Oct. 27, 1995

[86] PCT No.: PCT/GB95/02529

§ 371 Date: Sep. 23, 1997

§ 102(e) Date: Sep. 23, 1997

[87] PCT Pub. No.: WO96/13886

PCT Pub. Date: May 9, 1996

[30] Foreign Application Priority Data

Oct. 27, 1994 [GB] United Kingdom .................. 9421707

[51] Int. Cl.⁶ ...................................................... H02G 3/18
[52] U.S. Cl. ................................... 174/65 G; 174/17 CT
[58] Field of Search ............................ 174/65 G, 152 G, 174/153 G, 151, 135, 92, 17 CT; 248/56; 16/2.1, 2.2

[56] References Cited

U.S. PATENT DOCUMENTS

| | | | |
|---|---|---|---|
| 2,311,758 | 2/1943 | Johansson | 174/65 SS |
| 3,138,657 | 6/1964 | Wengen | 174/92 |
| 3,339,011 | 8/1967 | Ewers, Jr. et al. | 174/92 |
| 3,523,156 | 8/1970 | Phillips, Jr. | 174/38 |
| 3,757,031 | 9/1973 | Izraeli | 174/92 X |
| 4,550,220 | 10/1985 | Kitchens | 174/92 X |
| 4,849,580 | 7/1989 | Reuter | 174/92 |
| 4,963,698 | 10/1990 | Chang et al. | 174/77 R |
| 4,963,700 | 10/1990 | Olsen et al. | 174/92 X |
| 5,155,300 | 10/1992 | Brandner | 248/56 X |
| 5,569,882 | 10/1996 | Yokoyama et al. | 174/92 X |
| 5,594,210 | 1/1997 | Yabe | 174/92 X |

FOREIGN PATENT DOCUMENTS

| | | | |
|---|---|---|---|
| A2269485 | 2/1994 | European Pat. Off. | H01R 13/52 |
| C4336849 | 1/1995 | Germany | H02G 15/013 |
| 630688 | 9/1978 | U.S.S.R. | 174/151 X |
| 24441 | 11/1915 | United Kingdom | 174/152 G X |

*Primary Examiner*—Dean A. Reichard
*Attorney, Agent, or Firm*—Herbert G. Burkard

[57] ABSTRACT

A device for forming a seal around an elongate member, such as a wire, is provided. A device includes a first housing part and a second housing part movably connected to the first part. Sealing material such as a gel is positioned in the first housing part and provides a surface onto which the elongate member may be placed. A first member is positioned in the second housing part so as to displace the elongate member substantially laterally into the sealing material on movement of the second housing part relative to the first housing part. A device for applying a force to the sealing material on relative movement of the housing parts is also provided.

28 Claims, 5 Drawing Sheets

Fig.6E.

ENVIRONMENTAL PROTECTION

BACKGROUND OF THE INVENTION

The present invention relates to the provision of environmental protection around wires, optical fibres or other elongate substrates.

It is often necessary to seal wires at their points of entry into housings in order to protect connectors or electronic components within the housing from moisture or other contaminants that might otherwise enter the housing through the opening provided for the wire. This problem frequently occurs in telecommunications networks where devices for connection, electrical protection or isolation, are positioned outside buildings and are expected to have a long life-time under unfavourable weather conditions.

The invention is therefore particularly concerned with a device comprising some form of housing which has means for sealing wires at or adjacent their points of entry.

U.S. Pat. No. 4,859,809 (Jervis) discloses a splice case for sealing connectors joining small pair count telecommunications cables. First and second half-shells contain a gel sealing material and are held together by springs that function also to deform surfaces of the half-shells to put the sealing material therein under compression. The conductors enter the half-shells at their ends and lie between two layers of gel.

A two part closure for sealing wire connectors is also disclosed in U.S. Pat. No. 4,849,580 (Reuter). Again, each part contains a sealing material.

Reference may also be made to U.S. Pat. No. 4,963,700 (Olsen), U.S. Pat. No. 3,879,575 (Dobbin et al), U.S. Pat. No. 4,610,738 (Jervis), U.S. Pat. No. 3,757,031 (Izraeli) and DE G9004669.2 (3M). These documents confirm the common practice of providing sealing material in each of two half-shells that are brought together around the conductor to be sealed.

We have discovered that, particularly with careful choice of sealing material, a more economical sealing device can be produced.

Surprising, a single layer of sealing material can be caused to fold, or wrap, around a conductor to be sealed by lateral displacement of the conductor into the sealing material. This preferably occurs as parts of a sealing device are closed around the conductor.

SUMMARY OF THE INVENTION

Thus, the invention provides a device for forming a seal around an elongate member which comprises:

(a) a sealing material having a surface onto which the elongate member can be placed;

(b) means for displacing the elongate member substantially laterally into the sealing material; and (c) means for applying a force to said surface after displacement of the elongate member, thereby putting the sealing material under pressure.

Displacement of the elongate member into the sealing material will, in general, cause the sealing material to fold or wrap around the elongate member so that it forms a seal around its entire periphery. It is preferably the displacement itself which produces this result without any other displacement of the sealing material being required.

Those skilled in the art, after reading the specification, will be able to select sealing materials having the properties necessary to produce this result. The material is preferably sufficiently soft that the elongate member can be displaced laterally into it without damage to the elongate member. Where the elongate member is a wire typically used in a telecommunications network, we prefer that the sealing material have a Stevens Voland hardness of less than 60 g, preferably less than 45 g, more preferably less than 40 g, especially less than 35 g. In order that the material have sufficient stability during its service life we prefer that its Stevens Voland hardness be greater than 10 g, preferably greater than 15 g, Stevens Voland hardness is measured on a Stevens Leatherhead Food Research Association (LFRA) Texture Analyser having a stainless steel circular spindle of diameter of about 0.64 cm, rotating in slow mode at 0.2 mm/second and in fast mode at 2 mm/second, the measurement being taken at a penetration of 4 mm. The material preferably has a certain elasticity, and in particular preferably has an elongation to break of at least 100%, preferably at least 200%, more preferably at least 300%.

We prefer that, after displacement of the wire, not only that first and second parts of the surface of the sealing material contact one another around the wire, but also that the interface between those first and second parts disappears. It may disappear substantially immediately, or it may disappear gradually over time after the sealing material has been put under pressure. We prefer therefore that the sealing material has this property of eliminating an interface and this will generally mean that the sealing material is capable of, as it were, wetting itself.

A preferred class of materials that has this desirable property is that of liquid-extended polymers, in particular oil-extended polymers. Preferred materials may be classified as gels, as disclosed in U.S. Pat. No. 4,634,207 (Debbaut). That specification discloses encapsulation of electrical contacts through the use of gels which have been preformed in the absence of the contact; the preformed gel and the contact being pressed against each other thus deforming the gel into close and conforming contact with the contact. In general the contact is pushed longitudinally into the gel, and there is no disclosure of a wire being displaced laterally as required by the present invention. U.S. Pat. No. 4,634,207 discloses gels having a cone penetration value of at least 100, preferably 100–350, according to ASTM D217-68 at 21° C. on an undisturbed sample using a standard 1:1 scale cone (cone weight 102.5 g, shaft weight 47.5 g), the penetration being measured after 5 seconds.

The gels disclosed also have an elongation of at least 200%, elongation being measured according to ASTM D638-80 at 21° C. using a type 4 die to cut the sample and at a speed of 50 cm/minute. Suitable materials for the gel can be made by gelling a curable polyurethane, a silicone or a suitable block copolymer in the presence of substantial quantities of a mineral oil, a vegetable oil or a plasticizer. In the present invention any of these materials can be used, particularly those at the softer end of the above ranges. We particularly prefer a gel that comprises a styrene-ethylenebutylene-styrene (sebs) or a styrene-ethylenepropylene-styrene or a styrene-ethylenepropylene/ethylenebutylene-styrene block copolymer extended by a mineral oil. Suitable block copolymers of these types are marketed under the trademarks Kraton and Septon. The amount of block copolymer, relative to the amount of oil, can be varied to achieve the desired softness. Preferred Kraton-based gels may contain between 5 and 10% by weight of Kraton block copolymer.

In some instances other materials such as soft rubbers may be used as alternatives to gels.

The device of the invention preferably has first and second housing parts that can be brought together to form a substantially enclosed space. The sealing material is preferably provided substantially solely in the first part, and the means for displacing the wire and/or the means for applying the force is preferably provided in the second part. As a result, movement of the first and second parts together may directly result in displacement of the wire into the gel and/or in application of the force putting the gel under pressure. Thus, a single relative movement of the parts to close the housing will form the desired seal.

The sealing material may appear over a significant proportion of the surface of one of the housing parts. We prefer, however, that it be provided, or at least be exposed, merely at or around a periphery of one of the parts, for example in the form of a sealing bead.

The sealing material may be present as a single, uniform, flat layer or it may be shaped to improve the quality of the seal and/or to facilitate installation. In particular we prefer that the sealing material have a groove therein for receipt of the elongate member. The width of the groove is preferably from 0.25–0.75, especially about 0.5, times the width of the elongate member which the device is intended to seal. Devices of the type with which we are concerned are usually specialized products produced for installation in a particular network, and it will therefore usually be clear with what gauge wire or fibre etc the device is expected to be used. Furthermore, the device may include means for making an electrical connection etc. suitable only for conductors or fibres etc. of a particular gauge. Other means for terminating other elongate members, may be provided.

The device will usually include a housing containing the sealing material and having an inlet through which the conductor will pass. We prefer that this inlet comprise a slot, along the depth of which the conductor can be displaced as the seal is made.

One part of the device preferably has a first surface that abuts the conductor and causes the displacement when the first and second parts of the device are brought together. That part preferably also has a second surface that abuts the surface of the sealing material, and causes application of the force, when the first and second parts are brought further together. These first and second surfaces may comprise mutually adjacent steps.

The quality of the seal may be enhanced as a result of the surface of means (c) for applying the force being concave. Preferably means (c) surrounds at least 30% of the periphery of the conductor after the force has been applied. Also, an improved seal may be achieved if the means (c) is capable of providing a resiliently biased force. To this end, a metallic or other spring may be provided to bias together a part of the device carrying the sealing material and a part comprising means (c).

The device of the invention may serve merely to seal conductor splices, or it may serve to house an electronic component such as overcurrent protection, overvoltage protection, disconnection means and/or testing means.

BRIEF DESCRIPTION OF THE DRAWINGS

The invention is further illustrated with reference to the accompanying drawings, in which:

FIGS. 6A to 6E show a preferred embodiment in which the sealing material and the means (c) are shaped;

DESCRIPTION OF THE PREFERRED EMBODIMENTS

Figure 1:
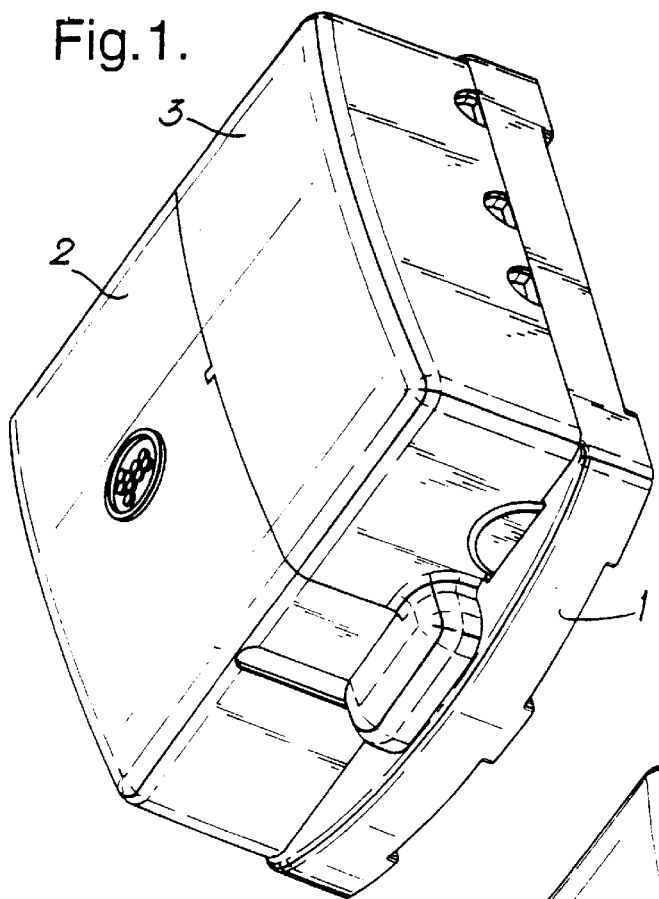
FIG. 1 shows a housing having a lid in the closed position.
Figure 2:
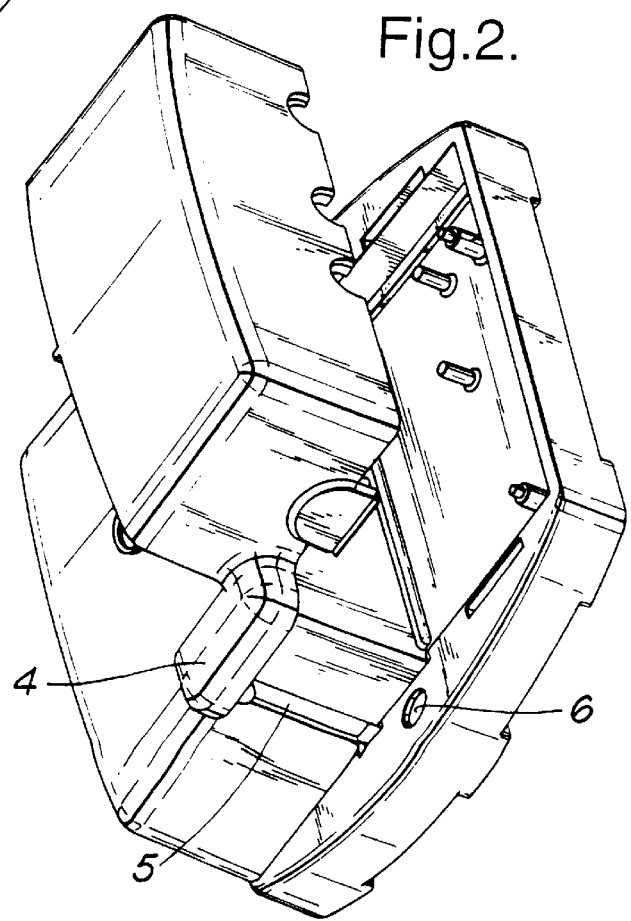
FIG. 2 shows the housing of FIG. 1 with the lid open.

FIGS. 1 and 2 show by way of example a device for housing an electronic component such as an electrical-protector in a telecommunications network. Conductors may enter the device for example through holes such as those shown in the upper right-hand surface and will require sealing in order that the electronic component be protected from the environment. The device comprises a base 1 which may be attached to an external wall, and a semi-permanently attached first cover 2 and a removable second cover 3. The cover 3 has fixing means 4 which allow it to be slid or rotated with respect to the first cover 2. For example means 4 may slide within a channel 5. Means 4 may protect screw holes 6 by means of which the base may be secured to the wall.

Figure 3:
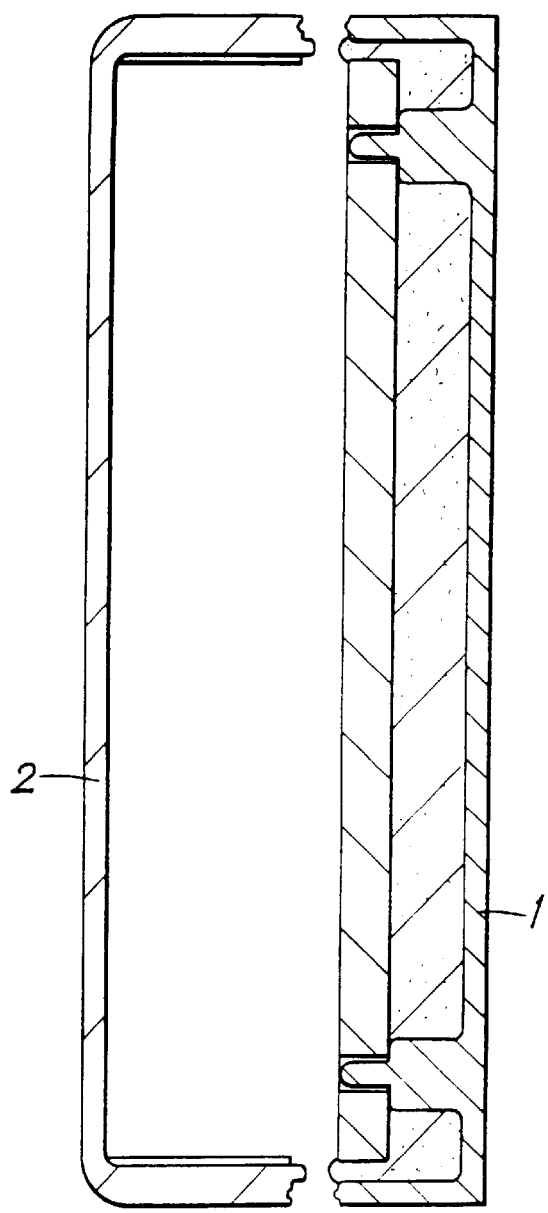
FIGS. 3 and 4 show cross-sectional views of a two-part housing.
Figure 4:
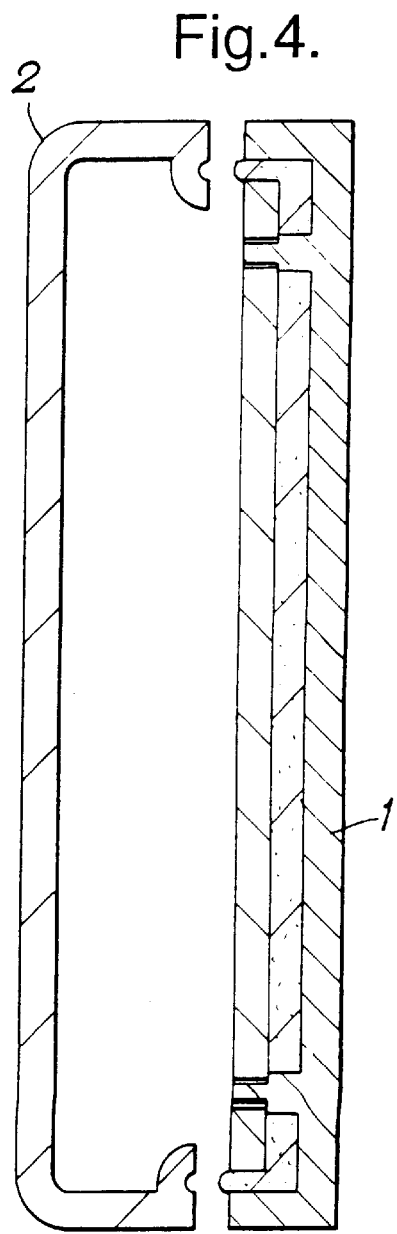

Cross-sections through such a device are shown in FIGS. 3 and 4 which show a printed circuit board supported within base 1 and overlying a sealing material. A bead of the sealing material is exposed around the printed circuit board. In the device of the invention a wire entering into the device for connection to the printed circuit board may overlie that bead of sealing material and be sealed in the way described above when the cover 2 and base 1 are brought together.

Figure 5A:
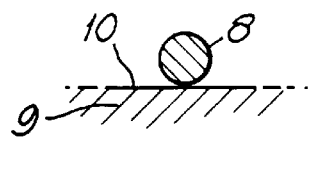
FIGS. 5A to 5D show lateral insertion of a wire into a sealing material.
Figure 5B:
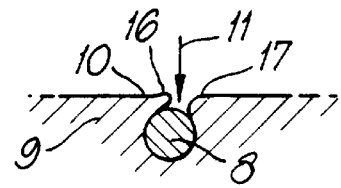
Figure 5C:
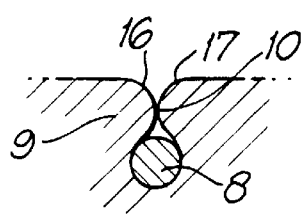
Figure 5D:
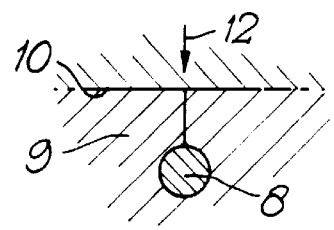

FIG. 5A shows a wire or other elongate member 8 on a surface 10 of sealing material 9. In FIG. 5B means (b), identified by arrow 11, has begun to displace the member 8 laterally into the sealing material. First and second parts 16, 17 of the surface 10 of the sealing material 9 can be seen to be moving together around the member 8. Further displacement of the member 8 as shown in FIG. 5C has resulted in the first and second parts 16, 17 of the surface of the sealing material contacting one another. In time the interface between the first and second parts 16, 17 will preferably disappear. In FIG. 5D means, identified by arrow (c) 12, for applying a force has been applied to surface 10.

Figure 6A:
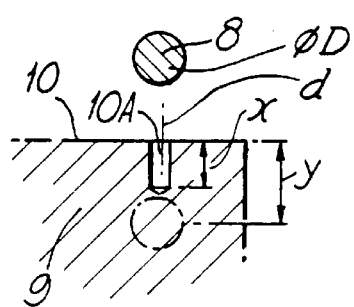

In FIG. 6A the surface 10 of the sealing material has a groove 10A for receipt of the member 8. The width of the groove is preferably about half of the diameter of the member 8, the depth of the groove, shown as distance x, is preferably equal to at least the diameter of the member 8 and the depth to which the member 8 is displaced, shown as distance y, is preferably from 1.5 to 2.5 times the depth of the groove.

Figure 6B:
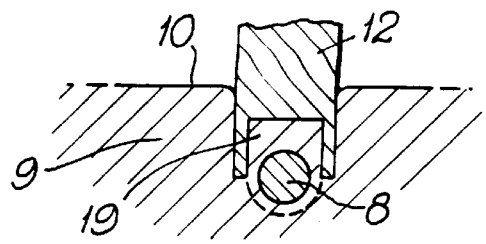
Figure 6C:
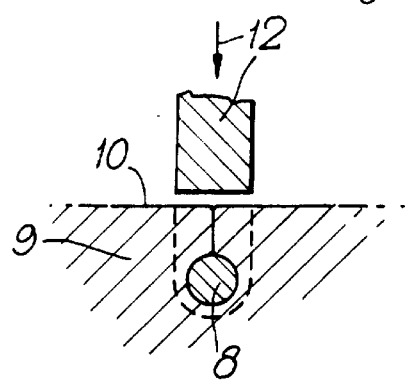
Figure 6D:
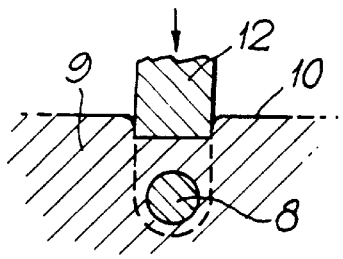

FIG. 6B shows the situation after full displacement of the member 8. FIG. 6C shows a part 12 of a cover of the device acting as means (c). The dotted line shows the position of a slot in a base of the device that carries the sealing material 9 and along the depth of which the member 8 can be displaced. In FIG. 6D the part 12 has been advanced slightly into the sealing material 9 causing the sealing material to be put under pressure. This pressure ensures a good seal around the member 8, and preferably can compensate for creep of the sealing material during its service life. In FIG. 6E part 12 that provides means (c) has a concave surface 19. The concave surface can at least partially surround the member 8 thereby applying forces in preferred directions and/or providing at least some containment for the sealing material 9.

Figure 7A:
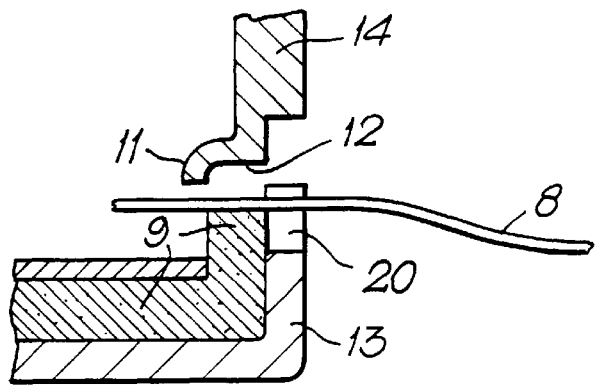
FIGS. 7A and 7B show closure of a device of the invention around a wire.
Figure 7B:
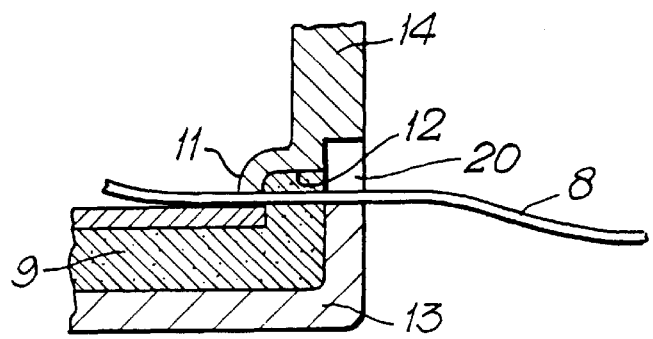

FIGS. 7A and 7B show in section a part of a base and cover of a housing such as that shown in FIGS. 1 to 4. Base 13 has a slot 20 through which wire 8 extends and along the depth of which the wire can be displaced. The base 13 contains sealing material 9 along a surface of which the wire 8 extends. A cover 14 is provided with means 11 for displacing the wire into the sealing material 9, and means 12 for applying a force to the surface of the sealing material after displacement of the wire. The means 11 and 12 can be seen to comprise mutually adjacent steps. FIG. 7A shows the parts before the base and cover have been closed together, and FIG. 7B shows the parts after closing.

Figure 8:
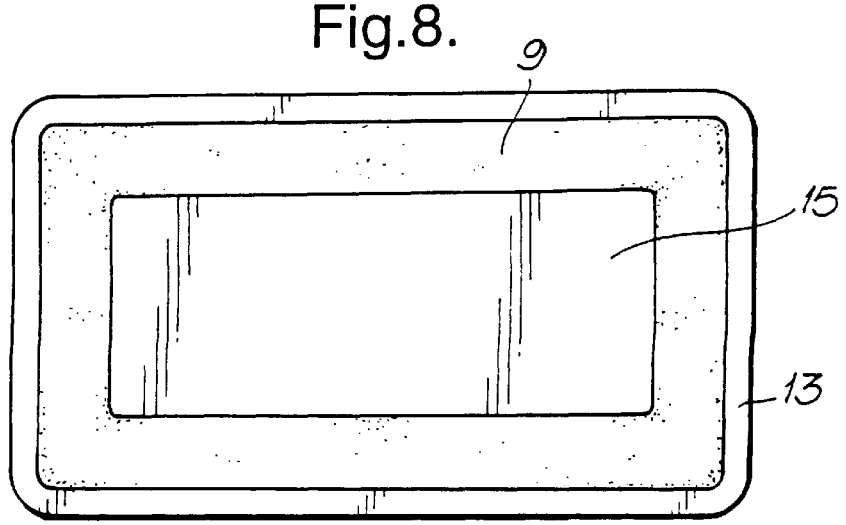
FIG. 8 shows a plan view of a part of a device of the invention.

FIG. 8 shows a plan view of the base 13 of FIGS. 7A and 7B. The base 13 contains a printed circuit board 15 surrounded by sealing material 9.

Figure 9A:
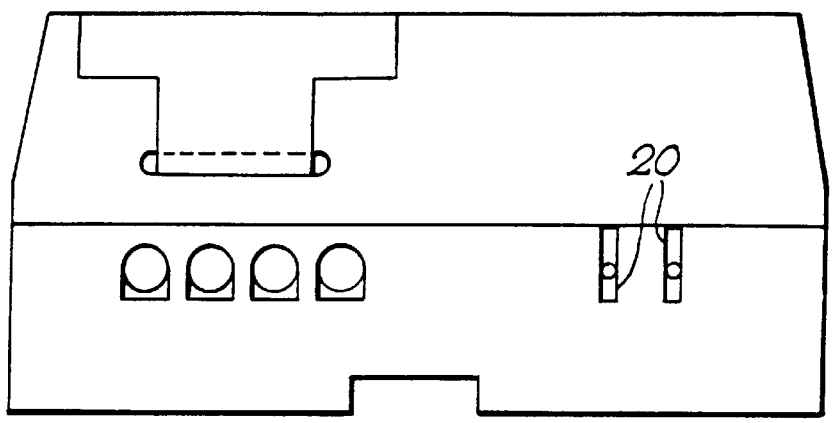
FIGS. 9A to 9C show sections through a device of the invention.
Figure 9B:
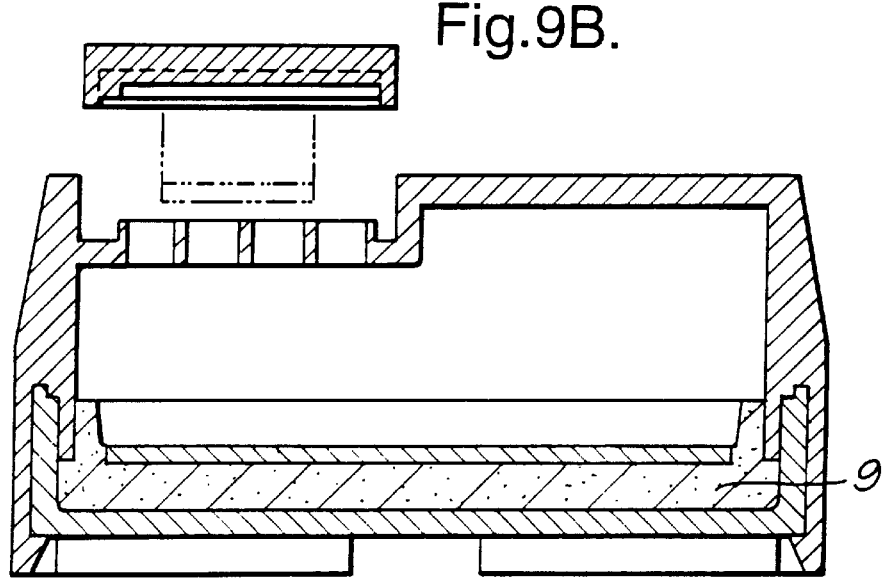
Figure 9C:
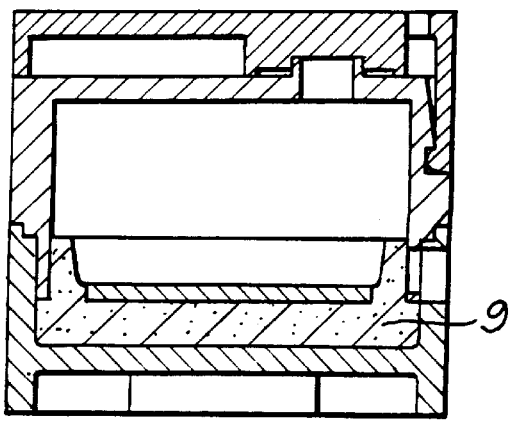

FIGS. 9A, 9B and 9C show sections of a particular design of housing. Sealing material 9 and slots 20 for location of an ingoing conductor are illustrated.

We claim:

1. A device for forming a seal around an elongate member which comprises:
   (a) a sealing material having a surface onto which the elongate member can be placed;
   (b) means for displacing the elongate member substantially laterally into the sealing material; and
   (c) means for applying a force to said surface after displacement of the elongate member thereby putting the sealing material under pressure.

2. A device according to claim 1, which has first and second housing parts that can be brought together to form a substantially enclosed space, the sealing material being provided in the first part, and at least one of the means for displacing and the means for applying a force being provided by the second part.

3. A device according to claim 2, in which movement of the first and second parts together results in at least one of the displacement and the application of the force.

4. A device according to claim 2 in which a single movement of the first part relative to the second part results first in the displacement and subsequently in application of the force.

5. A device according to claim 2, in which the sealing material is exposed substantially only at a periphery of the first part.

6. A device according to claim 2, in which the second part has a first surface that abuts the elongate member and causes the displacement when the first and second parts are brought together to a first extent; and a second surface that abuts the surface of the sealing material and causes application of the force when the first and second parts are brought together to a greater extent.

7. A device according to claim 6, in which the first and second surfaces comprise mutually adjacent steps.

8. A device according to claim 1 in which the means for applying a force applies the force by advancing in a direction substantially parallel to the direction of the displacement.

9. A device according to claim 1 in which the displacement itself results in the sealing material surrounding the elongate member.

10. A device according to claim 1, including a housing which has a slot through which the elongate member can enter and along the depth of which the member can be displaced.

11. A device according to claim 1, in which the sealing material comprises a gel.

12. A device according to claim 1 in which the means for applying a force is capable of providing a resiliently biased force.

13. A device according to claim 1, in which, after the displacement, first and second parts of the surface contact one another around the elongate member.

14. A device according to claim 13, in which the sealing material is capable of wetting itself such that the first and second parts seal to one another on contact.

15. A device according to claim 1, in which the surface of the sealing material has a groove therein for receipt of the elongate member.

16. A device according to claim 15, in which the width of the groove is from 0.25 to 0.75 times the width of the elongate member which the device is intended to seal.

17. A device according to claim 1, in which a surface of said means for applying a force is concave.

18. A device according to claim 17, in which the means for applying a force surrounds at least 30% of the periphery of the elongate member after the force has been applied.

19. A device according to claim 1, in which the sealing material has a Stevens Voland hardness of less than 60 g.

20. A device according to claim 19, in which the sealing material has a Stevens Voland hardness of from 10 to 45 g.

21. A device for forming a seal around an elongate member comprising:
   a first housing part;
   a second housing part movably connected to the first housing part;
   a gel positioned in the first housing part and having a surface onto which the elongate member can be placed;
   wherein the second housing part includes a first substantially rigid member positioned to displace the elongate member substantially laterally into the gel on movement of the second housing part relative to the first housing part; and
   wherein at least one of the first housing part and the second housing part includes a second member positioned to apply a force to the gel on movement of the second housing part relative to the first housing part.

22. A device according to claim 21 wherein the first substantially rigid member is positioned to displace the elongate member so that the gel substantially entirely surrounds the elongate member.

23. A device according to claim 21 wherein the surface of the gel is positioned substantially only at a periphery of the first housing part.

24. A device according to claim 21 wherein the second member is included in the second housing part and includes a second surface that abuts the surface of the gel and applies a force directly to the surface of the gel.

25. A device according to claim 21 wherein the first substantially rigid member includes a first surface that abuts the elongate member.

26. A device according to claim 25 wherein the second member is included in the second housing part and includes a second surface that abuts the surface of the gel and applies a force to the surface of the gel.

27. A device according to claim 26 wherein the first surface and the second surface comprise mutually adjacent steps.

28. A device according to claim 26 wherein the first surface abuts the elongate member on movement of the second housing part relative to the first housing part to a first extent and wherein the second surface abuts the surface of the gel on movement of the second housing part relative to the first housing part to a greater extent.

* * * * *